(12) United States Patent
Harrington et al.

(10) Patent No.: US 9,447,581 B2
(45) Date of Patent: Sep. 20, 2016

(54) ROOFING MATERIAL WITH LOCALLY APPLIED FIRE RESISTANT MATERIAL

(71) Applicant: Owens Corning Intellectual Capital, LLC, Toledo, OH (US)

(72) Inventors: Edward Richard Harrington, Toledo, OH (US); Jonathan M. Verhoff, Granville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 14/978,105

(22) Filed: Dec. 22, 2015

(65) Prior Publication Data

US 2016/0186437 A1    Jun. 30, 2016

Related U.S. Application Data

(62) Division of application No. 14/585,739, filed on Dec. 30, 2014, now Pat. No. 9,242,432.

(51) Int. Cl.
*E04D 1/00* (2006.01)
*E04D 1/28* (2006.01)
*E04B 1/94* (2006.01)

(52) U.S. Cl.
CPC ............... *E04D 1/28* (2013.01); *E04B 1/941* (2013.01); *E04D 2001/005* (2013.01)

(58) Field of Classification Search
CPC ..................... Y10T 428/243; Y10T 428/19
USPC .............. 52/518, 519, 523, 525, 526, 527
See application file for complete search history.

(56) References Cited

U.S. PATENT DOCUMENTS

| | | | | |
|---|---|---|---|---|
| 3,180,783 A | * | 4/1965 | Walker | C08L 95/00 156/71 |
| 3,365,322 A | * | 1/1968 | Hinds | E04D 1/26 428/145 |
| 4,218,502 A | * | 8/1980 | Graham | E04B 1/94 428/144 |
| 4,234,639 A | * | 11/1980 | Graham | B32B 11/02 106/18.12 |
| 4,372,997 A | * | 2/1983 | Fritze | B32B 11/10 428/144 |
| 4,521,333 A | * | 6/1985 | Graham | C04B 18/021 106/18.12 |
| 5,258,216 A | | 11/1993 | von Bonin et al. | |
| 5,326,797 A | * | 7/1994 | Zimmerman | C08L 95/00 524/371 |
| 5,615,523 A | * | 4/1997 | Wells | E04D 1/20 52/309.1 |

(Continued)

FOREIGN PATENT DOCUMENTS

| | | |
|---|---|---|
| EP | 135261 | 3/1985 |
| EP | 301176 | 2/1994 |
| EP | 2532515 | 12/2012 |

OTHER PUBLICATIONS

Office action from U.S. Appl. No. 14/209,510 dated Mar. 11, 2016.

(Continued)

*Primary Examiner* — Mark Wendell
(74) *Attorney, Agent, or Firm* — Calfee, Halter & Griswold LLP

(57) ABSTRACT

A roofing shingle having fire resistance material added to the shingle in a localized area includes a substrate having a first portion and a second portion, a first asphalt-based coating impregnating the first portion, the first asphalt coating including a fire retardant material, and a second asphalt-based coating impregnating the second portion, the second asphalt coating containing less of the fire retardant material than the first asphalt coating.

18 Claims, 6 Drawing Sheets

(56) References Cited

U.S. PATENT DOCUMENTS

| | | | | |
|---|---|---|---|---|
| 5,657,603 A * | 8/1997 | Goodhart | | E04D 1/06 52/519 |
| 5,840,413 A * | 11/1998 | Kajander | | C03C 25/34 428/292.1 |
| 5,965,257 A * | 10/1999 | Ahluwalia | | C03C 17/007 427/389.8 |
| 6,194,519 B1 * | 2/2001 | Blalock | | C08L 19/003 524/444 |
| 6,235,347 B1 * | 5/2001 | Arshinova | | B27K 3/153 106/18.14 |
| 6,352,786 B2 * | 3/2002 | Arshinova | | C08L 91/06 106/18.14 |
| 6,436,510 B1 * | 8/2002 | Heidel | | D06N 3/0056 428/142 |
| 6,610,147 B2 * | 8/2003 | Aschenbeck | | B05C 9/04 118/308 |
| 6,635,140 B2 * | 10/2003 | Phillips | | B05D 5/061 156/259 |
| 6,990,779 B2 | 1/2006 | Kiik et al. | | |
| 7,272,915 B2 * | 9/2007 | Peng | | B29C 70/30 162/157.1 |
| 7,805,909 B2 | 10/2010 | Teng et al. | | |
| 7,857,904 B2 * | 12/2010 | Trumbore | | C08L 91/06 106/270 |
| 8,240,102 B2 * | 8/2012 | Belt | | B32B 3/10 52/527 |
| 9,242,432 B1 | 1/2016 | Harrington, Jr. et al. | | |
| 2003/0040241 A1 * | 2/2003 | Kiik | | A47G 27/0468 442/242 |
| 2006/0240224 A1 | 10/2006 | Khan et al. | | |
| 2007/0166454 A1 * | 7/2007 | Gupta | | B05D 1/02 427/202 |
| 2008/0086970 A1 * | 4/2008 | Teng | | E04D 1/26 52/518 |
| 2008/0102243 A1 | 5/2008 | Gupta | | |
| 2008/0188590 A1 | 8/2008 | Gupta | | |
| 2009/0104425 A1 * | 4/2009 | Nandi | | C09D 5/18 428/221 |
| 2009/0229210 A1 * | 9/2009 | Binkley | | B29C 65/56 52/543 |
| 2010/0037548 A1 * | 2/2010 | Kalkanoglu | | B29C 47/046 52/309.1 |
| 2010/0167013 A1 | 7/2010 | Cruz | | |
| 2011/0011021 A1 * | 1/2011 | LaVietes | | C09D 5/18 52/408 |
| 2011/0118371 A1 | 5/2011 | Staal et al. | | |
| 2011/0232220 A1 | 9/2011 | Belt et al. | | |
| 2012/0180948 A1 * | 7/2012 | Aschenbeck | | B05D 1/30 156/269 |
| 2012/0183684 A1 * | 7/2012 | Aschenbeck | | B05C 19/04 427/187 |
| 2012/0183685 A1 * | 7/2012 | Aschenbeck | | B05D 5/02 427/187 |
| 2013/0025225 A1 | 1/2013 | Vermilion et al. | | |
| 2013/0035225 A1 * | 2/2013 | Barbaro | | B01J 31/069 502/4 |
| 2014/0130435 A1 * | 5/2014 | Paradis | | E04D 1/28 52/309.12 |
| 2014/0272244 A1 | 9/2014 | Harrington, Jr. et al. | | |

OTHER PUBLICATIONS

GrafTech International, Grafguard, Flame Retardant Additive, Technical Data Sheet 226, May 16, 2014.
Office action from U.S. Appl. No. 14/209,510 dated Jan. 30, 2015.
Office action from U.S. Appl. No. 14/209,510 dated Aug. 11, 2015.
Advisory action from U.S. Appl. No. 14/209,510 dated Jan. 25, 2016.
Office action from U.S. Appl. No. 14/585,739 dated Feb. 6, 2015.
Office action from U.S. Appl. No. 14/585,739 dated May 13, 2015.
Notice of Allowance from U.S. Appl. No. 14/585,739 dated Oct. 5, 2015.

* cited by examiner

ROOFING MATERIAL WITH LOCALLY APPLIED FIRE RESISTANT MATERIAL

CROSS-REFERENCE TO RELATED APPLICATIONS

The present application is a divisional of U.S. patent application Ser. No. 14/585,739, filed on Dec. 30, 2014, titled "ROOFING MATERIAL WITH LOCALLY APPLIED FIRE RESISTANT MATERIAL," the disclosure of which is incorporated herein by reference in its entirety.

FIELD OF THE INVENTION

The present application generally relates to roofing material and, more particularly, to asphalt-based roofing material having fire resistance material added in a localized area.

BACKGROUND OF THE INVENTION

Asphalt-based roofing materials, such as roofing shingles, roll roofing and commercial roofing, are installed on the roofs of buildings to provide protection from the elements and to give the roof an aesthetically pleasing look. Typically, the roofing material is constructed of a substrate, such as a glass fiber mat or an organic felt, an asphalt coating on the substrate, and a protective and/or decorative surface layer of granules of stone, mineral, sand or other particulate material embedded in the tacky asphalt coating.

Roofing materials are expected to perform and maintain their appearance over time and in various conditions. The American Society of Testing Materials (ASTM) and Underwriters Laboratories (UL) have developed specifications, testing, and ratings for various properties of roof shingles, such as fire resistant, impact resistance, and wind resistance. Shingle manufacturers desire to provide roofing materials that meet or exceed the various standards, such as the UL 790, class A rating for fire resistance. To help achieve satisfactory performance regarding fire resistance, it is known to add fire resistant materials to roofing shingles and other roofing materials.

SUMMARY OF THE INVENTION

A roofing shingle having fire resistance material added to the shingle in a localized area is disclosed. The roofing shingle includes a substrate having a first portion and a second portion, a first asphalt-based coating impregnating the first portion, the first asphalt coating including a fire retardant material, and a second asphalt-based coating impregnating the second portion, the second asphalt coating containing less of the fire retardant material than the first asphalt coating. In one embodiment, the substrate includes an overlay sheet laminated to an underlay sheet along a common bond area and the first asphalt-based coating impregnates the substrate in the common bond area.

Various objects and advantages will become apparent to those skilled in the art from the following detailed description of the invention, when read in light of the accompanying drawings. It is to be expressly understood, however, that the drawings are for illustrative purposes and are not to be construed as defining the limits of the invention.

BRIEF DESCRIPTION OF THE DRAWINGS

The accompanying drawings, which are incorporated in and constitute a part of this specification, illustrate some embodiments disclosed herein, and together with the description, serve to explain principles of the embodiments disclosed herein.

DETAILED DESCRIPTION OF THE INVENTION

Figure 1:
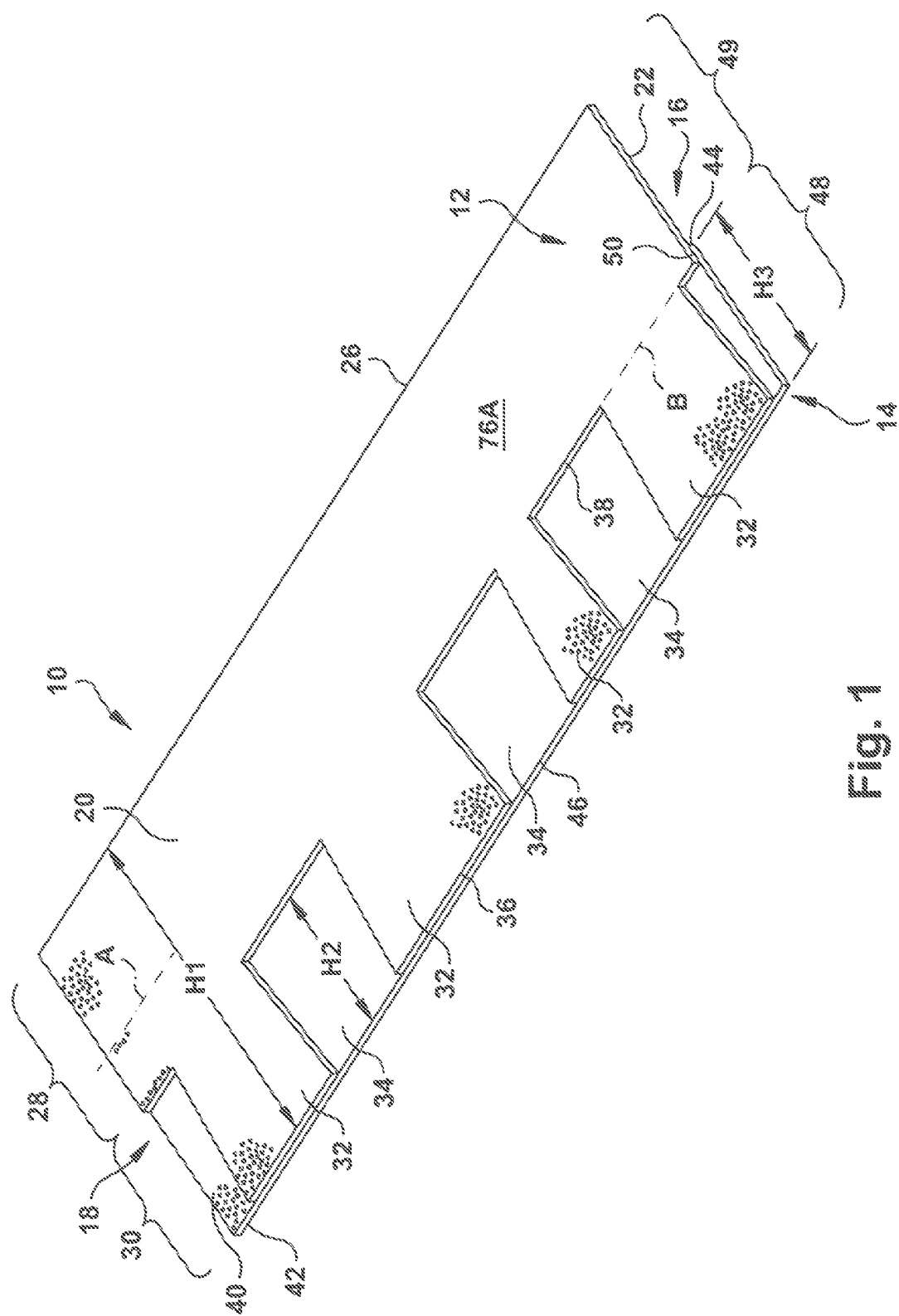
FIG. 1 is a perspective view of an exemplary embodiment of a roofing shingle.

The embodiments disclosed herein will now be described by reference to some more detailed embodiments, in view of the accompanying drawings. These embodiments may, however, be embodied in different forms and should not be construed as limited to the embodiments set forth herein. Rather, these embodiments are provided so that this disclosure will be thorough and complete, and will fully convey the scope of the inventions to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements. Every numerical range given throughout this specification and claims will include every narrower numerical range that falls within such broader numerical range, as if such narrower numerical ranges were all expressly written herein.

As used in the description and the appended claims, the phrase "asphalt" is defined as any type of bituminous material suitable for use on a roofing material, such as asphalts, tars, pitches, or mixtures thereof. The asphalt may be either manufactured asphalt produced by refining petroleum or naturally occurring asphalt. The asphalt may include various additives and/or modifiers, such as inorganic fillers or mineral stabilizers, organic materials such as polymers, recycled streams, or ground tire rubber. Preferably, the asphalt contains asphalt and an inorganic filler or mineral stabilizer.

As used in the description of the invention and the appended claims, the term "longitudinal" or "longitudinally" is defined as substantially parallel with the machine direction. The terms "top" and "bottom", when used regarding the roofing material, are in reference to the roofing material when installed on a roof. "Bottom" referring to the portion facing towards the roof deck and "top" referring to the portion facing away from the roof deck.

FIG. 1 illustrates an exemplary embodiment of an asphalt-based roofing shingle 10 that includes fire resistant material applied in a localized area on the shingle. The shingle 10 may be configured in a variety of ways. For example, the shape, the size, the types of materials used, the number of layers, and other properties may vary. Any configuration that is suitable for use as a roofing shingle may be used. The exemplary embodiment of FIG. 1 is depicted as a laminate shingle 10 including an overlay sheet 12 disposed on and attached to an underlay sheet 14. In other embodiments, however, the shingle 10 may be configured as a single sheet, such as a three-tab shingle, or a multilayered shingle having more than two sheets. The shingle 10 includes a first side 16, a second side 18 spaced apart from the first side and a longitudinal axis A. The overlay sheet 12 is generally planar and has a top face 20, a bottom face 22 opposite and generally parallel to the top face, and a rear edge 26 extending from the first side 16 to the second side 18 of the shingle 10.

The overlay sheet 12 is disposed on and adhered to the underlay sheet 14 thereby defining both a two-layer portion 48 of the laminated shingle 10 and a single-layer portion 49 of the laminated shingle. As illustrated in FIG. 1, the front edge 36 of each tab 32 is generally aligned with the front edge 46 of the underlay sheet 14. The overlapping area 50 of the overlay sheet 12 and the underlay sheet 14 between the rear edge 44 of the underlay sheet 14 and the line B is referred to as a common bond area, which extends longitudinally from the first side 16 to the second side 18. The overlay sheet 12 may be attached to the underlay sheet 14 by any suitable manner, such as for example, by a laminate adhesive, as is known in the art.

The underlay sheet 14 is generally planar and has a top face 40, a bottom face 42 opposite and generally parallel to the top face, a rear edge 44 extending from the first side 16 to the second side 18 and a front edge 46 opposite the rear edge and extending from the first side 16 to the second side 18. The underlay sheet has a third height H3.

The overlay sheet 12 is disposed on and adhered to the underlay sheet 14 thereby defining both a two-layer portion 48 of the laminated shingle 10 and a single-layer portion 50 of the laminated shingle. As illustrated in FIG. 1, the front edge 36 of each tab 32 is generally aligned with the front edge 46 of the underlay sheet 14. The overlapping area 52 of the overlay sheet 12 and the underlay sheet 14 between the rear edge 44 of the underlay sheet 14 and the line B is referred to as a common bond area, which extends longitudinally from the first side 16 to the second side 18. The overlay sheet 12 may be attached to the underlay sheet 14 by any suitable manner, such as for example, by a laminate adhesive, as is known in the art.

Figure 2:
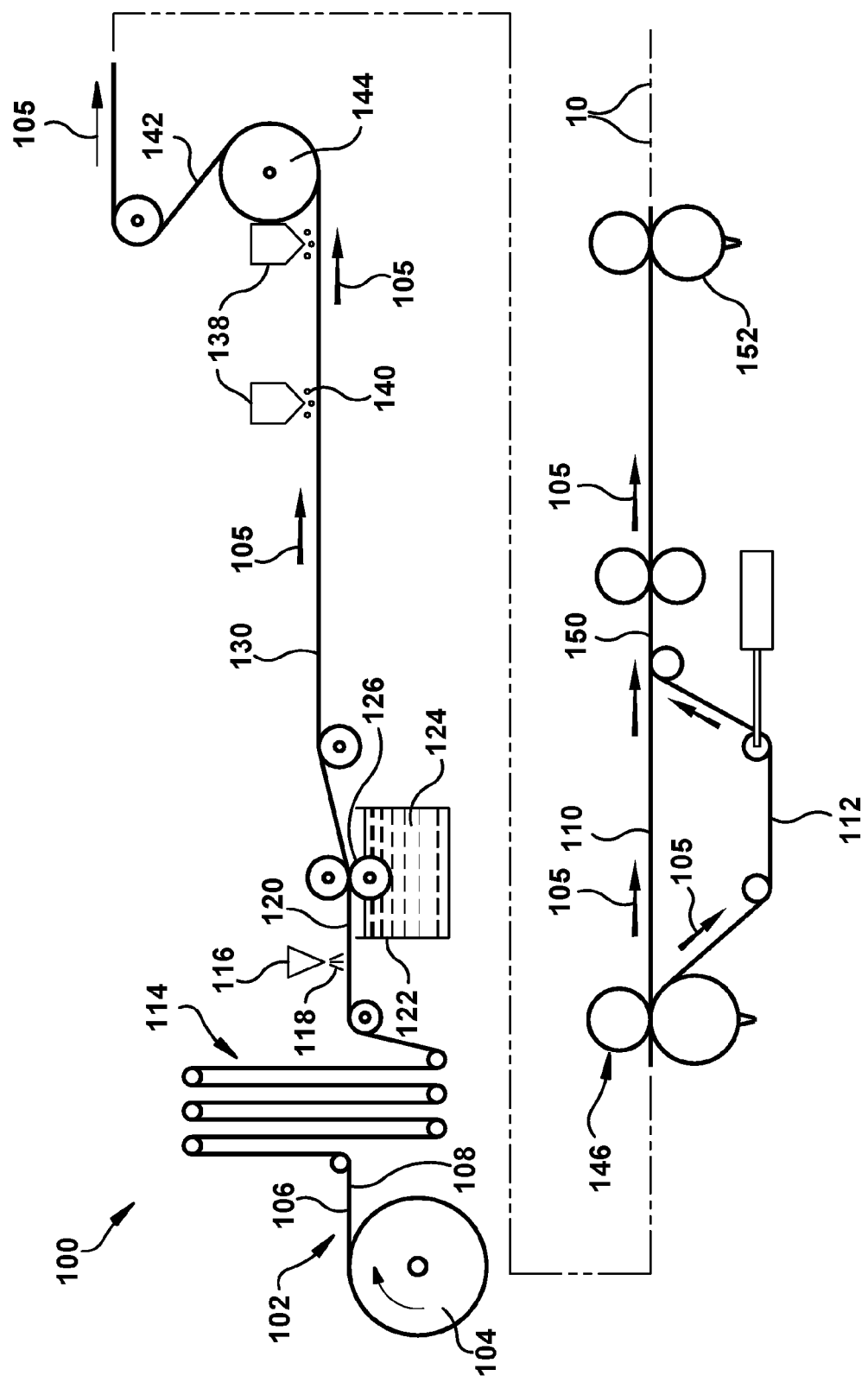
FIG. 2 is a schematic view of an apparatus and process for manufacturing the shingle of FIG. 1.
Figure 3:
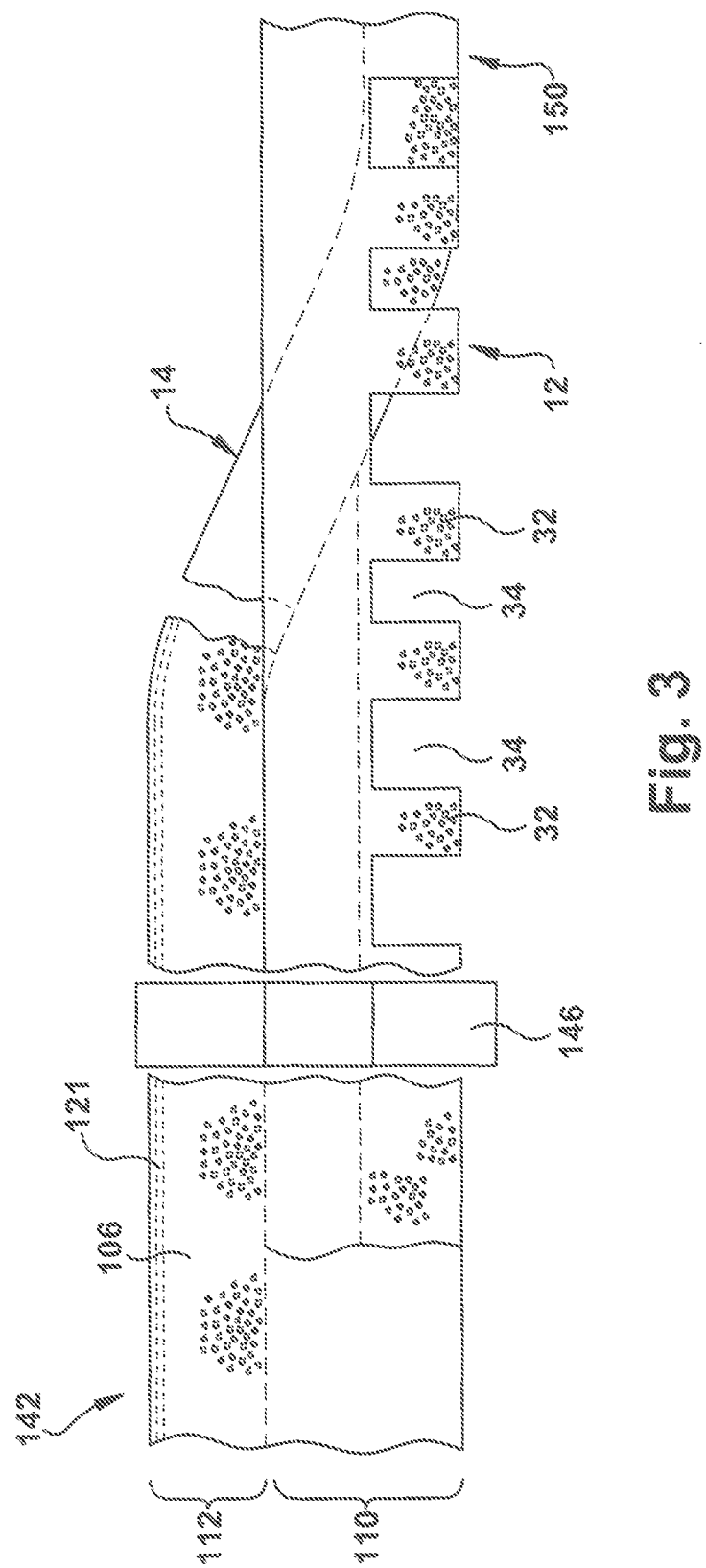
FIG. 3 is a plan view of a portion of the substrate sheet of the shingle of FIG. 1 being processed in the apparatus of FIG. 2.

FIG. 2 illustrates an exemplary manufacturing process 100 for manufacturing the asphalt-based roofing shingle 10 according to the invention. In a first step of the manufacturing process, a continuous sheet of substrate or mat 102 is payed out from a roll 104 in a machine direction 105. The substrate 102 may be any material suitable for use in asphalt-based roofing materials. For example, the substrate 102 may be a type known for use in asphalt-based roofing materials, such as a nonwoven web of glass fibers, a scrim or felt of fibrous materials such as mineral fibers, cellulose fibers, rag fibers, mixtures of mineral and synthetic fibers, or the like. The substrate 102 includes a top side 106 and a bottom side 108. In the exemplary embodiment, the overlay sheet 12 and the underlay sheet 14 will both be manufactured at the same time from the same continuous sheet of substrate 102 as shown in FIG. 3. Thus, the substrate 102 includes an overlay portion 110 and an underlay portion 112. In other embodiments, however, the overlay sheet 12 and the underlay sheet 14 may be manufactured separately.

The sheet of substrate 102 is passed from the roll 104 through an accumulator 114. The accumulator 114 allows time for splicing one roll 104 of substrate to another, during which time the substrate 102 within the accumulator 114 is fed to the manufacturing process so that the splicing does not interrupt manufacturing.

Next, the substrate 102 is passed to a first coater 116 where a first asphalt coating 118 is selectively applied to the substrate in one or more predetermined locations to form a first asphalt coated substrate 120. The first asphalt coating 118 includes a fire retardant material. Any of a wide variety of fire retardant materials may be used in the first asphalt coating. For example, the fire retardant material may be a material that provides improved fire performance by intumescence, by releasing water during decomposition, by insulation, by char formation, or by other means. Non-limiting examples of fire retardant materials that may be used include phosphoric acid treated asphalt, aluminum trihydroxide (ATH), magnesium hydroxide (MDH), colemanite, hydromagnesite, boehmite, borax (tincal), ulexite, huntite, borates, ammonium polyphosphate, feric acid treated asphalt, brucite, gibbsite, dragonite-XR, silapore, nano clays, expanadable graphite, chlorinated fire retardant compounds, fumed silica, and other suitable materials.

The amount of fire retardant material included in the first asphalt coating 118 may vary. Any amount suitable for use with an asphalt coating on a roofing shingle may be used. As a non-limiting example, the first asphalt coating 118 may have in the range of about 0.25% to about 6.0% by weight of one of, or a combination of, expandable graphite, ammonium polyphosphates and Borax. As another non-limiting example, the first asphalt coating 118 may have in the range of about 4% to about 20% by weight of one of, or a combination of, colemanite, aluminum trihydrate, and magnesium hydroxide. The amount of fire retardant material included in the first asphalt coating 118 can dependent on the amount of and location of the first asphalt coating 118 on the substrate 102.

The first asphalt coating 118 may be applied in any suitable manner, such as, for example, sprayed, rolled, extruded, or pumped onto the substrate 102. In addition, the first asphalt coating 118 may be selectively applied to any area on the substrate 102. For example, the first asphalt coating 118 may be applied to the top side 106, the bottom side 108, or both sides of the substrate 102. Furthermore, the first asphalt coating 118 may be applied to the overlay portion 110, the underlay portion 112, or both portions of the substrate 102. In an exemplary embodiment, a continuous row or bead of the first asphalt coating 118, extending in the direction of the longitudinal axis A represented by the dashed lines 121 in FIG. 3, is pumped onto the top side 106 of the underlay portion 112 of the substrate 102 in an area that will be within at least a portion of the common bond area 50 of the shingle 10. In other embodiments, however, the first asphalt coating 118 may be applied as multiple rows, as multiple discontinuous beads, or in any other suitable manner. The continuous row, in the exemplary embodiment may be in the range of about 0.25 inches wide to about 4.0 inches wide, but may vary in other embodiments.

The first asphalt coated substrate 120 is then passed to a second coater 122 where a second asphalt coating 124 is applied to the first asphalt coated substrate. The second asphalt coating may be applied in any suitable manner, such as, for example, sprayed, rolled or pumped onto the substrate 120. Unlike the first asphalt coating 118, the second asphalt coating 120 may not include any of the fire retardant material of the first asphalt coating, may include less of the fire retardant material than the first asphalt coating 118, or may include a different fire retardant material. In an exemplary embodiment, the second asphalt coating 120 is a conventional filled asphalt used on asphalt based shingles; thus, the second asphalt coating does not include the first retardant material of the first asphalt coating.

In the exemplary embodiment of FIG. 2, the second asphalt coating 124 is applied on the top side 106 of the first asphalt coated substrate 120 prior to a pair of rollers 126 such that as the first asphalt coated substrate 120 moves between the nip point of the two roller configuration 126, the rollers completely cover the top side 106 of the substrate 120 with the second asphalt coating 124 to form a second asphalt coated sheet 130. While the rollers 126 completely cover the top side 106 of the substrate 102 with the second asphalt coating 124, the rollers also spread out the first asphalt coating 118 within at least a portion of the common bond area 50. The row of the first asphalt coating 118 may be sized as desired to control how much the rollers spread out the first asphalt coating 118. For example, the row of the first asphalt coating 118 may be sized to ensure that the first asphalt coating remains entirely within the common bound area 50 of the shingle 10, though that is not required. The first asphalt coating 120 and the second asphalt coating 124 impregnate and saturate the substrate 102 and may form an asphalt layer on the top side 106 and the bottom side 108 of the substrate 102. In addition, the second asphalt coating 124 may be applied such that it does not cover, only partially covers, or completely covers the first asphalt coating 120.

Next, in one exemplary embodiment, the first asphalt coating 120 and the second asphalt coating 124 are in a range from about 350 degrees F. to about 400 degrees F. when applied. In other embodiments, however, the asphalt coatings 120, 124 may be more than 400 degrees F. or less than 350 degrees F.

The second asphalt coated sheet 130 is passed beneath one or more granule dispensers 138 for the application of granules 140 (FIG. 4) to the top side 106 of the second asphalt coated sheet 130 to form a granule coated sheet 142. The granule dispensers 138 can be of any type suitable for depositing granules onto the asphalt coated sheet and the granules can be any granulates suitable for use with roofing material. The granules 140 may be applied to the entire top side 106 of the sheet 130 or selectively to portions of the sheet. For example, the granules 140 may be applied to the entire top side of the underlay portion 112 but only the tab portion 30 of the overlay portion 110.

The granule-coated sheet 142 is then turned around a slate drum 144 to press the granules 140 into the asphalt coating and to temporarily invert the sheet so that the excess granules will fall off and will be recovered and reused. After the granule-coated sheet 142 is turned around the slate drum 144, a backing agent (not shown), such as sand, may optionally be applied to the bottom side 108 of the granule-coated sheet 142 to the extent that the bottom side becomes entirely encapsulated. Release film (not shown) may optionally be applied to the bottom side 108 of the granule-coated sheet 142 while the sheet wraps around the slate drum 144 and prior to the application of the backing agent.

The granule-coated sheet 142 is subsequently fed through a rotary pattern cutter 146. As shown in FIG. 3, the pattern cutter 146 cuts a repeated pattern of tabs 32 and cutouts 34 also longitudinally cuts the granule-coated sheet 142 to separate the overlay portion 110 from the underlay portion 112. Once separated, the underlay portion 112 may be directed to be aligned beneath the overlay portion 110, and the two portions may be laminated together to form a continuous laminated sheet 150. Further downstream, the continuous laminated sheet 150 is passed into contact with a rotary length cutter 152 that cuts the laminated sheet 150 into the individual laminated shingles 10.

Figure 4:
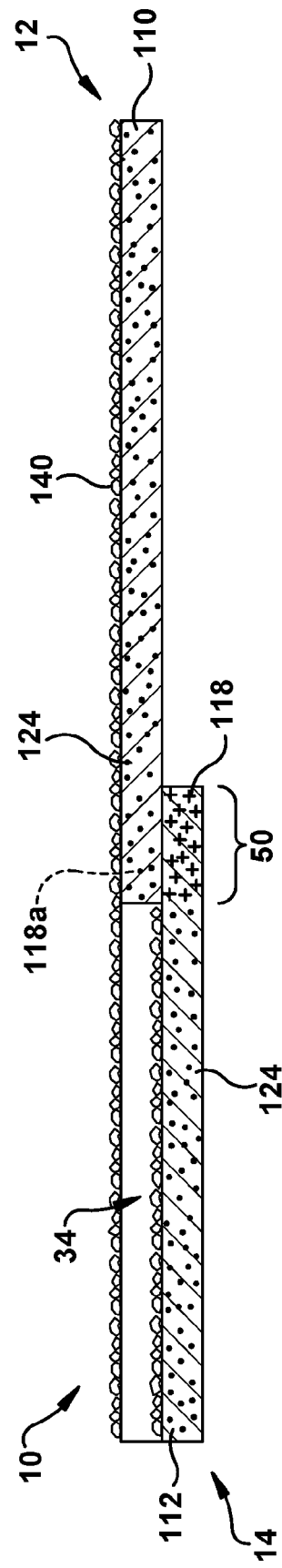
FIG. 4 is a side sectional view of the shingle of FIG. 1.

In the exemplary embodiment of the shingle 10 of FIGS. 1 and 4, the overlay sheet 12 is laminated onto the underlay sheet 14 along the common bond area 50 and along the tabs 32. The overlay sheet 12 includes the overlay portion 110 of the substrate 102 and is impregnated with the second asphalt coating 124 and covered in granules 140. The underlay sheet 14 includes the underlay portion 112 of the substrate 102 and is impregnated with the first asphalt coating 118 in at least a portion of the common bond area 50 and with the second asphalt coating 124 in other areas, such as areas not impregnated with the first asphalt coating or areas at least a portion of which are outside of the common bond area 50. The first asphalt coating 118, however, may be applied to the overlay portion 110, the underlay portion 112, or both portions. For the exemplary embodiment in FIG. 4, for example, the overlay portion 110 may be impregnated with the first asphalt coating 118a in at least a portion of the common bond area 50.

Applying the first asphalt coating 118 containing a fire retardant material to a localized area on the shingle 10 is beneficial in a number of ways. By including the fire retardant material in the filled asphalt coating, the fire retardant material is encapsulated and will not wash off, which some water soluble fire retardant material can. In addition, applying the fire retardant material to a localized area allows placement of the fire retardant material where it is most useful in providing the shingle, and roof on which the shingle is installed, with fire resistance while at the same time avoiding placing the fire retardant material in areas where it could negatively impact other shingle properties, such as granule adhesion or tear strength in the exposed area of the shingle. For example, placing an asphalt coating containing fire retardant material at the common bond area can prevent failure in this area. An intumescent fire retardant material, for example, swells when exposed to the heat of the fire, thus creating a barrier between a fire and the asphalt coating. The intumescent fire retardant material obstructs the flow of any asphalt in the common bond area that may liquefy and obstructs the flow of air into the common bond area.

Figure 5:
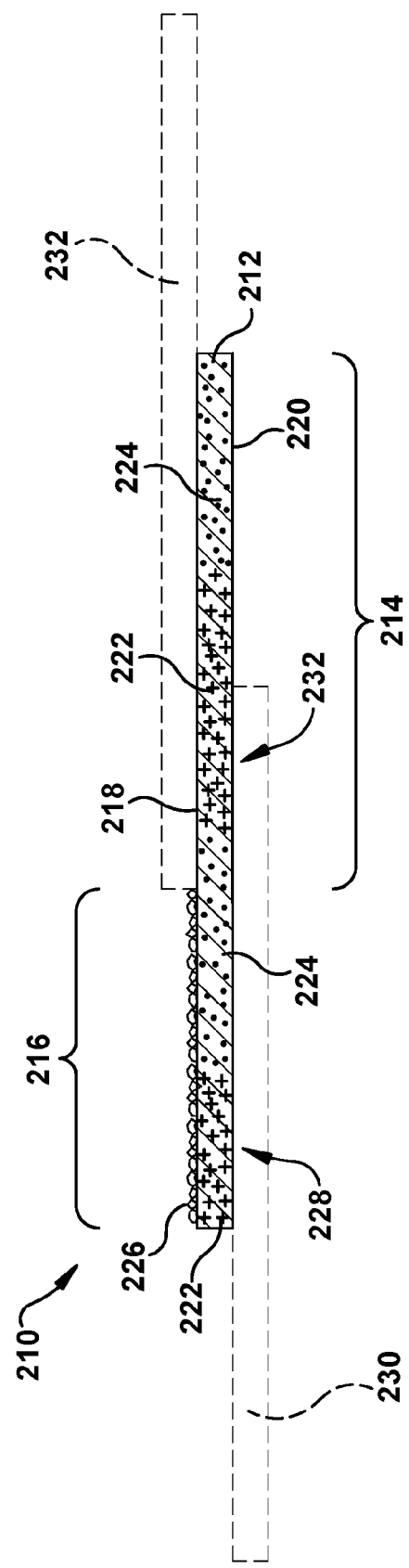
FIG. 5 is a side sectional view of another exemplary embodiment of a roofing shingle.
Figure 6:
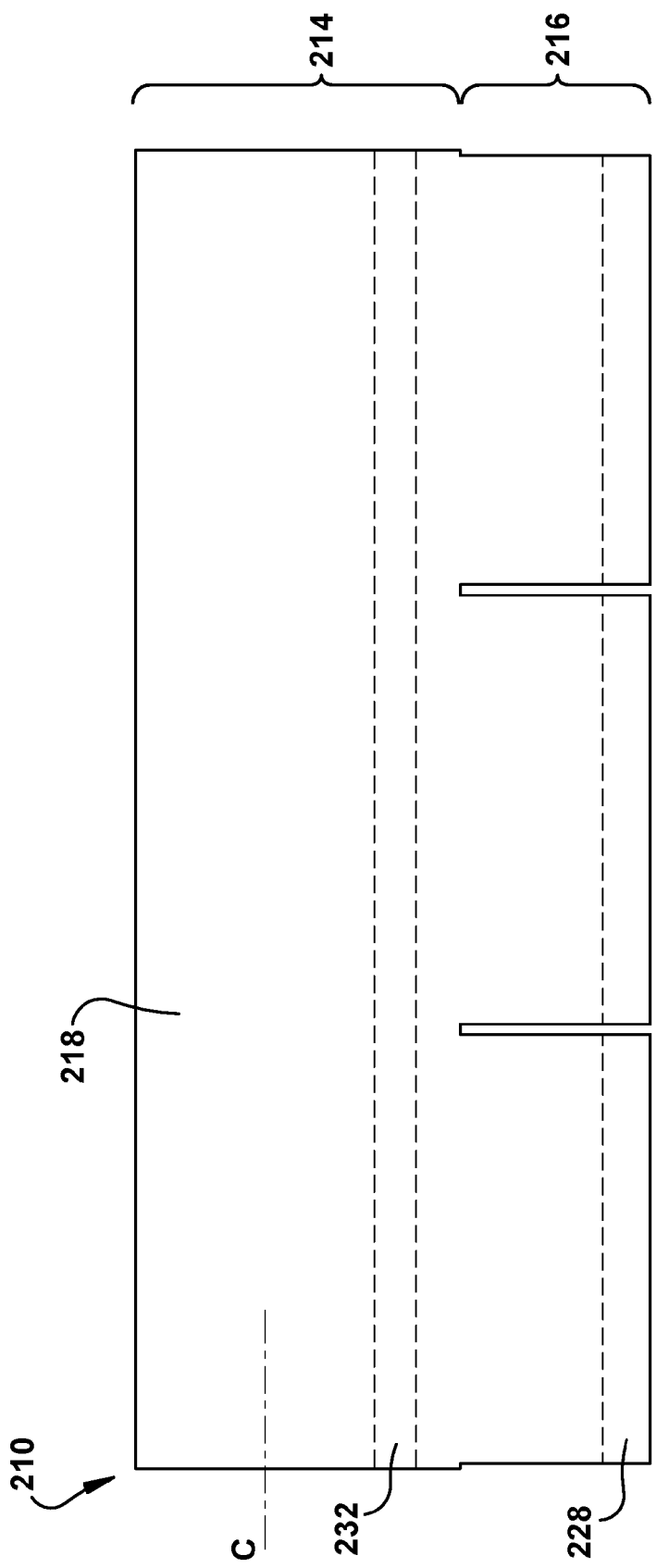
FIG. 6 is a top view of the roofing shingle of FIG. 5.

FIGS. 5 and 6 illustrate another exemplary embodiment of a shingle 210. The shingle 210 is similar to the shingle 10 of FIGS. 1 and 4 in that the shingle includes a substrate 212 having a headlap portion 214, a tab portion 216, a top face 218, and a bottom face 220. The substrate 212 is coated with a first asphalt coating 222 containing a fire retardant material, a second asphalt coating 224, and a layer of granules 226 on the top face 218. The first asphalt coating 222 is applied in a localized area on the substrate 212. The second asphalt coating 224 may not include any fire retardant material, may include less fire retardant material than the first asphalt coating 222, or may include a different fire retardant material. Unlike shingle 10, however, the shingle 210 is not a laminate shingle with an overlay sheet and an underlay sheet. Instead, the shingle 210 is a single layer, such as a three tab shingle configuration.

The shingle 210 includes the first asphalt coating 222 applied to an area in which the shingle 210 and an adjacent shingle overlap when installed on a roof. For example, the first asphalt coating 222 may be applied to a first area 228 that includes at least a portion of the tab portion 216 that is disposed on top of the adjacent underlying shingle 230 or to a second area 232 that includes at least a portion of the headlap portion 214 that is disposed under an adjacent overlaying shingle 234, or in both locations. The first asphalt coating 222 may be applied as a continuous row or bead extending across the first area 228, the second area, or both, in the direction of the longitudinal axis C. In other embodiments, however, the first asphalt coating 222 may be applied as multiple rows, as multiple discontinuous beads, or in any other suitable manner.

As with the shingle 10 of FIGS. 1 and 4, impregnating the shingle 210 with asphalt coating containing fire retardant material locally in an area where the shingle overlaps an adjacent shingle, or is overlapped by an adjacent shingle, can prevent failure in this area. For example, an intumescent fire retardant material at the interface between adjacent shingles can obstruct the flow of any asphalt in the overlapping area that may liquefy and obstruct the flow of air into the overlapping area.

The above description of specific embodiments has been given by way of example. From the disclosure given, those skilled in the art will not only understand the general inventive concepts and attendant advantages, but will also find apparent various changes and modifications to the structures and methods disclosed. For example, the general inventive concepts are not typically limited to any particular roofing material. Thus, for example, use of the inventive concepts to various roofing materials, such as for example roofing shingles, roll roofing and commercial roofing, are within the sprit and scope of the general inventive concepts. As another example, although the embodiments disclosed herein have primarily been directed to locally applying an asphalt coating including a fire retardant material to a portion of a shingle, the general inventive concepts could be readily extended to local application of a fire retardant material in any manner which could benefit roofing material, including any location on the roofing material and through application separate from an asphalt coating. It is sought, therefore, to cover all such changes and modifications as fall within the spirit and scope of the generally inventive concepts, as described and claimed herein, and equivalents thereof.

The invention claimed is:

1. A roofing shingle, comprising:
a substrate having a first portion and a second portion;
a first asphalt coating containing asphalt and a fire retardant material, the first asphalt coating and fire retardant material impregnating the first portion and forming a layer on a bottom side of the first portion;
a second asphalt coating impregnating the second portion, the second asphalt coating containing less of the fire retardant material than the first asphalt coating; and
a layer of granules applied onto at least a portion of a top side of the substrate.

2. The roofing shingle of claim 1 wherein the second asphalt coating contains none of the first retardant material.

3. The roofing shingle of claim 1 wherein the fire retardant material is intumescent.

4. The roofing shingle of claim 1 wherein the fire retardant material is expandable graphite.

5. The roofing shingle of claim 1 wherein the first asphalt coating includes about 0.25% to about 6.0% by weight of one or more materials from the group consisting of expandable graphite, ammonium polyphosphates and Borax or about 4% to about 20% by weight of one or more materials from the group consisting of colemanite, aluminum trihydrate, and magnesium hydroxide.

6. The roofing shingle of claim 1 wherein the substrate comprises an overlay sheet laminated to an underlay sheet along a common bond area, and wherein the first portion is in, or proximate to, the common bond area.

7. The roofing shingle of claim 6 wherein the first portion is located such that when the shingle is exposed to high heat, the fire retardant material obstructs the flow of liquefied asphalt from the common bond.

8. The roofing shingle of claim 1 wherein the substrate is a first substrate that is configured to overlay a second substrate, and wherein the first portion is proximate to the location where the first substrate overlays the second substrate.

9. A method for manufacturing a roofing shingle having a substrate, comprising:
forming a first asphalt coating comprising a mixture of asphalt and a fire retardant material;
forming an asphalt coated sheet by applying the first asphalt coating to a first portion of the substrate and applying a second asphalt coating containing asphalt and less of the fire retardant material than the first asphalt coating to a second portion of the substrate; and
applying granules to a top side of the asphalt coated sheet to form a granule coated sheet,
wherein the asphalt and fire retardant material of the first asphalt coating impregnates the first portion of the substrate and the asphalt of the second asphalt coating impregnates the second portion of the substrate.

10. The method of claim 9 wherein the second portion is impregnated with none of the fire retardant material.

11. The method of claim 9 wherein the first portion is in, or proximate to, the common bond area.

12. The method of claim 9 wherein the fire retardant material is intumescent.

13. The method of claim 9 wherein the fire retardant material is expandable graphite.

14. The method of claim 9 wherein the substrate is a first substrate that is configured to overlay a second substrate, and wherein the first portion is proximate to the location where the first substrate overlays the second substrate.

15. The method of claim 9 wherein the first asphalt coating impregnates at least a bottom side of the substrate in the first portion.

16. The method of claim 9 further comprising:
separating the granule coated sheet into an underlay sheet and an overlay sheet; and
laminating the overlay sheet onto the underlay sheet along a common bond area.

17. The method of claim 16 wherein the first portion is in, or proximate to, the common bond area.

18. The method of claim 16 wherein the first portion is located such that when the shingle is exposed to high heat, the fire retardant material obstructs the flow of liquefied asphalt from the common bond area.

* * * * *